(12) United States Patent
Nambu et al.

(10) Patent No.: US 6,200,481 B1
(45) Date of Patent: Mar. 13, 2001

(54) CHELATE-FORMING FIBER, PROCESS FOR PREPARING THE SAME, AND USE THEREOF

(75) Inventors: Nobuyoshi Nambu; Osamu Ito, both of Yokkaichi; Nobutake Mihara, Chiba; Koujirou Nagatsuka, Washimiya-machi, all of (JP)

(73) Assignees: Chelest Corporation; Chubu Chelest Co., Ltd., both of Osaka (JP)

( * ) Notice: Subject to any disclaimer, the term of this patent is extended or adjusted under 35 U.S.C. 154(b) by 0 days.

(21) Appl. No.: 09/405,000

(22) Filed: Sep. 27, 1999

Related U.S. Application Data

(63) Continuation of application No. PCT/JP98/01076, filed on Mar. 12, 1998, now abandoned.

(30) Foreign Application Priority Data

Mar. 25, 1997 (JP) .................................................. 9-072433

(51) Int. Cl.$^7$ .............................................. D06M 13/328
(52) U.S. Cl. .............................. 210/681; 210/911; 8/181; 8/115.56
(58) Field of Search .................................. 8/181, 115.56; 210/681, 911; 428/364

(56) References Cited

FOREIGN PATENT DOCUMENTS

| | | |
|---|---|---|
| 60-102947 | 6/1985 | (JP) . |
| 2-099189 | 4/1990 | (JP) . |
| 3-064577 | 3/1991 | (JP) . |
| 3-215533 | 9/1991 | (JP) . |

OTHER PUBLICATIONS

Derwent abstract of JP 03215533A, Sep. 1991.*

\* cited by examiner

*Primary Examiner*—Margaret Einsmann
(74) *Attorney, Agent, or Firm*—Smith Patent Office

(57) ABSTRACT

A chelate-forming fiber which has, in a fiber molecule, a group having an amino group and at least two hydroxyl groups bonded to carbon (preferably a group represented by the formula (1) described below), and has a capability of forming a chelate with metalloid elements including boron and germanium and compounds thereof, and which can be easily incinerated and can be prepared in a simple and safe manner at low cost; and a process for preparing the same; and a method for capturing metalloids or compounds thereof using the chelate-forming fiber are disclosed.

[1]

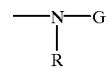

(wherein G represents a sugar alcohol residue or a polyhydric alcohol residue, and R represents a hydrogen atom, a (lower) alkyl group, or G (G is as defined above and may be a group identical with or different from the above G).)

18 Claims, 4 Drawing Sheets

CHELATE-FORMING FIBER, PROCESS FOR PREPARING THE SAME, AND USE THEREOF

This is a continuation of International Application PCT/JP98/01076, with an international filing date of Mar. 12, 1998, now abandoned.

BACKGROUND OF THE INVENTION

1. Field of the Invention

The present invention relates to a novel fiber having a capability of forming a chelate with metalloid elements such as boron, germanium, arsenic, antimony, selenium, tellurium, etc. and compounds thereof, a process for producing the same, and a method for capturing metalloid elements or compounds thereof (hereinafter referred merely to as metalloid elements or metalloid element component, sometimes) using said fiber. This fiber can be widely utilized for purification of industrial water and agricultural water, cleaning of air, and recovery of metalloid elements, industrially, because of its efficient performance of selectively adsorbing a trace amount of metalloid elements and compounds thereof, which are present in water and a gas.

2. Description of the Prior Art

Boron and boron compounds as a kind of metalloid elements are widely distributed in the nature and are essential to the human body, however, it is confirmed that large uptake of them exhibits an adverse influence on the human body. The case considered to be an artificial pollution due to boron components contained in river and underground water has recently been reported so that there is a fear of an adverse influence on reuse of water and on agriculture. A trace amount of boron components are also present with dusts in the air, and it has also been reported that these boron components can cause defects when a semiconductor device is produced.

In addition to boron, arsenic and arsenic compounds are also harmful to human body and it is necessary to remove as possible from potable water and various exhaust gases in which arsenic and arsenic compounds are considered to be included. Furthermore, since germanium, antimony, selenium and tellurium are expensive elements, it is considered to be very effective, from an industrial point of view, to efficiently scavenge from various liquid waste and exhaust gas, which contain a trace amount of them.

The method for removing metalloid elements such as boron in water includes, for example, a method using a basic ion exchange resin. The present inventors confirmation made it clear that the performance of capturing metalloid elements is drastically lowered when other anions are present in a system to be treated because selective adsorption of the basic ion exchange resin to the metalloid elements such as boron are very poor.

On the other hand, a chelate resin with a performance of capturing boron components exists and a method for removing boron components contained in irrigation water using the chelate resin is also known. This chelate resin is a beads-like or granular, resin wherein aminopolyol groups are introduced into a polymer having a rigid three-dimensional crosslinked structure, such as styrene-divinylbenzene resin and phenol-aldehyde resin, and following problems are pointed out, that is, the capturing amount and rate of the boron components are small and the regenerating rate is also very small in case where the chelate resin containing captured boron components is regenerated. Although the above-mentioned chelate resin exhibits a certain degree of an effect of removing or capturing the boron components contained in water, a rate of diffusion into the resin is slow and a specific surface area to be effectively utilized for forming a chelate with metalloid element is very small. Therefore, the chelate resin hardly exhibits a performance of removing (or capturing) a trace amount of the boron components contained in a gas (e.g. air, various exhaust gases, etc.) and can not be applied to use to which a high-degree removing treatment is required, for example, purification of a semiconductor device production apparatus. These facts become a serious problem in case where arsenic and compounds thereof, which are harmful to human body, are removed.

On the other hand, boron, germanium, selenium, tellurium, and antimony are useful elements for development of new materials for supporting current frontier industries, such as superconductive material, semiconductor material, neutron absorbing material, etc., and it is considered that these elements can be utilized, very effectively from an industrial point of view, if a technique capable of efficiently capturing these metalloid elements to obtain them in a concentrated state can be established.

Under these circumstances, the present invention has been accomplished. A first object of the present invention is to provide a chelate-forming fiber which has excellent performance of capturing metalloid and compounds thereof. A second object of the present invention is to provide a process for efficiently producing the chelate-forming fiber. A third object of the present invention is to provide a method for capturing metalloid elements and compounds thereof.

SUMMARY OF THE INVENTION

The present invention provides a technique which can efficiently adsorb and remove metalloid elements and compounds thereof from water and various exhaust gases, or which can efficiently uptake and recover them.

The chelate-forming fiber according to the present invention, which could have solved the above problems, refers to a fibrous chelate scavenger which has, in a fiber molecule, a group having an amino group and two or more hydroxyl groups, particularly at least two hydroxyl groups bonded to adjacent carbon, and has a capability of forming a chelate with metalloid elements or compounds thereof.

Preferred group to be introduced into the fiber molecule to impart the capability of forming a chelate with metalloid elements or compounds thereof can be represented by the following general formula [1]:

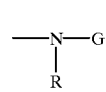

[1]

(wherein G represents a chain sugar alcohol residue or a chain polyhydric alcohol residue, and R represents a hydrogen atom, a (lower) alkyl group, or G (G is as defined above and may be a group identical with or different from the above G).)

The process for preparing the metalloid element chelate-forming fiber according to the present invention, comprises reacting a reactive functional group in a fiber molecule directly with an amine compound represented by the following general formula [2]:

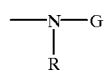

(wherein G and R are as defined above).

Still another aspect of the present invention is characterized in that the metalloid elements or compounds thereof are captured by using the above chelate-forming fiber.

DETAILED DESCRIPTION OF THE PREFERRED EMBODIMENTS OF THE INVENTION

Figure 1:
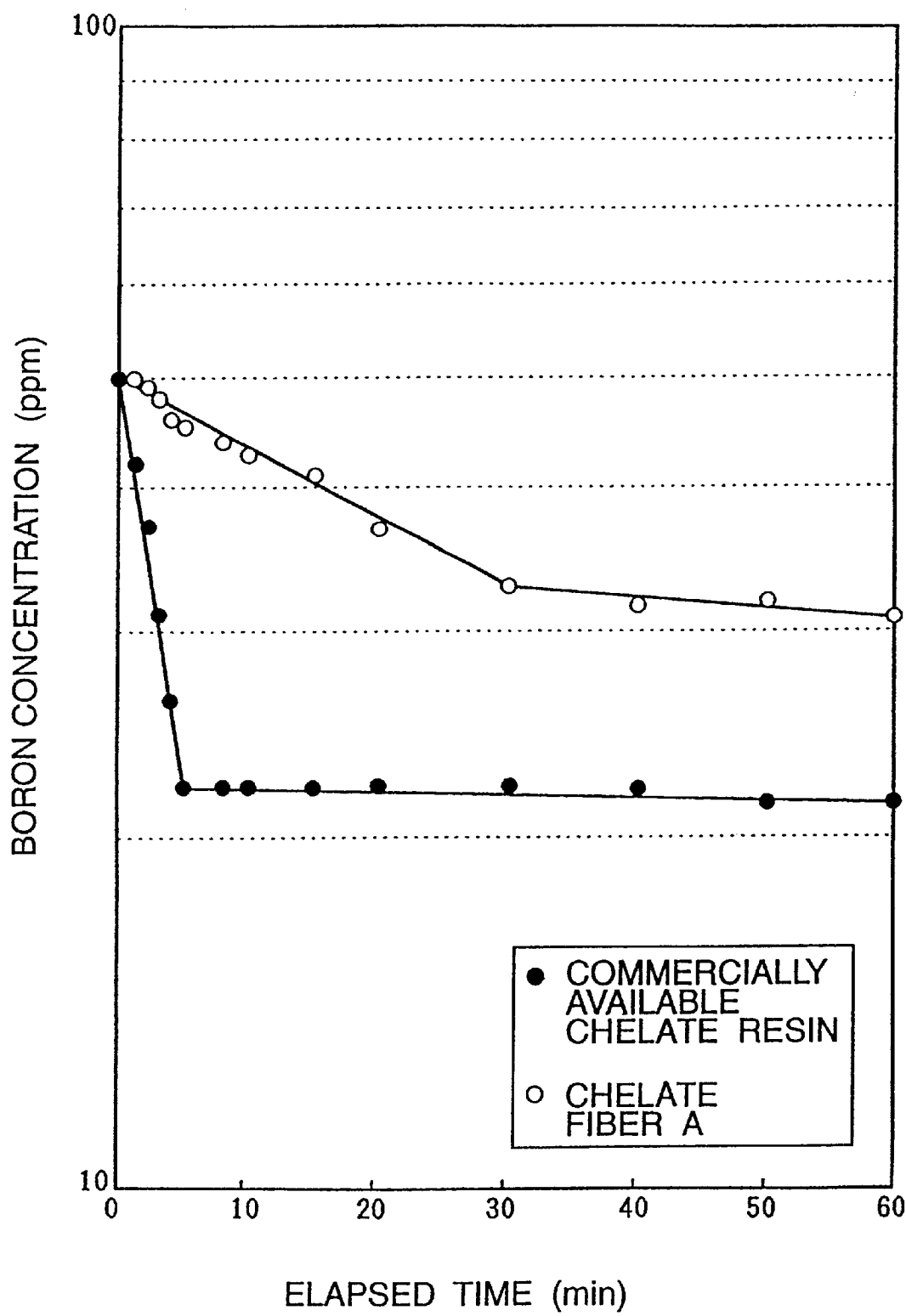
FIG. 1 is a graph showing a relation between the boron concentration and the scavenging rate of the chelate fiber A obtained in the example as compared with a commercially available beads-like chelate resin.

The chelate-forming fiber according to the present invention, which could have solved the above problems, refers to a fibrous chelate scavenger which has, in a fiber molecule, a group having an amino group and two or more hydroxyl groups, particularly at least two hydroxyl groups bonded to adjacent carbon, and has a capability of forming a chelate with metalloid elements or compounds thereof.

Preferred group to be introduced into the fiber molecule to impart the capability of forming a chelate with metalloid elements or compounds thereof can be represented by the following general formula [1]:

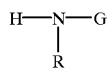

(wherein G represents a chain sugar alcohol residue or a chain polyhydric alcohol residue, and R represents a hydrogen atom, a (lower) alkyl group, or G (G is as defined above and may be a group identical with or different from the above G).) Among them, particularly preferred one is a group wherein G in the above formula [1] is a D-glucamine residue in which an amino group is eliminated or Hydroxylpropyl group and R is a hydrogen atom or a lower alkyl group.

Preferred group to be introduced into the fiber molecule to impart the capability of forming a chelate with metalloid elements or compounds thereof (hereinafter referred to as a metalloid element chelate-forming capability, sometimes) may be bonded directly to a reactive functional group (e.g. hydroxyl group, amino group, imino group, aldehyde group, carboxyl group, thiol group, etc.) in the fiber molecule, or may also be bonded indirectly to the reactive functional group through a crosslinkage. As the fiber, which are imparted the chelate forming capability, any of natural, regenerated and synthetic fibers can be used. Among them, natural and regenerated fibers are particularly preferred so as to efficiently introduce the group having a chelate-forming capability as described above.

The process for preparing the metalloid element chelate-forming fiber according to the present invention, comprises reacting a reactive functional group in a fiber molecule directly with an amine compound represented by the following general formula [2]:

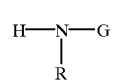

(wherein G and R are as defined above), or after reacting the reactive functional group with a compound having, in a molecule, two or more groups selected from an epoxy group, a reactive double bond and a halogen group, and then reacting the reaction product with the amine compound represented by the above formula [2]. The amine compound to be used herein, which is most suitable for practical use in synthetic view of the metalloid element chelate-forming capability, reactivity with the fiber molecule, and production cost, is D-glucamine, N-methyl- D-glucamine or dihydroxypropylamine.

Still another aspect of the present invention is characterized in that the metalloid elements or compounds thereof are captured by using the above chelate-forming fiber. In this case, there can be employed a process wherein the chelate-forming fiber is brought into contact with a liquid containing metalloid elements or compounds thereof to capture the metalloid elements or compounds thereof in the liquid, or a process wherein the chelate-forming fiber is brought into contact with a gas containing metalloid elements or compounds thereof to capture the metalloid elements or compounds thereof in the gas.

In the present specification, the present invention will be described with respect to boron, which is a most typical metalloid element, exclusively, but the present invention can also be applied to other metalloid elements, other than boron, and compounds thereof.

The metalloid element chelate-forming fiber of the present invention is characterized in that a capability of forming a chelate with metalloid elements or compounds thereof is imparted by introducing a group having an amino group and a hydroxyl group, preferably two or more hydroxyl groups, more preferably at least two hydroxyl groups bonded to adjacent carbon, into the fiber molecule, as described above. The metalloid element chelate capturing reaction by using the fiber, into which N-methyl-D-glucamine residue is introduced, will be illustrated with respect to boron as an example, as shown in the following scheme

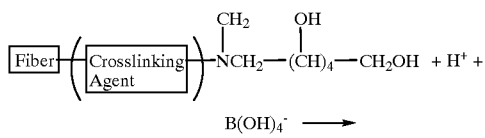

-continued

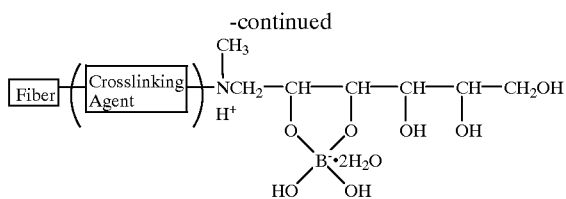

That is, according to the present invention, excellent chelate-forming capability with metalloid elements such as boron can be imparted to the fiber by introducing a group represented by the above formula[1], which has an amino group and two or more hydroxyl groups, particularly at least two hydroxyl groups bonded to adjacent carbon, thereby making it possible to effectively capture the metalloid elements.

In the present invention, the kind of the fiber, to which the metalloid element chelate-forming capability is imparted, is not specifically limited and, for example, there can be used various vegetables fibers including cotton, hemp, etc.; various animal fibers including silk, wool, etc.; regenerated fibers including viscose rayon, etc.; and synthetic fibers including polyamide, acryl, polyester, etc. These fibers may also be those which are modified, if necessary.

Among these fibers, vegetable, animal and regenerated fibers having, in a fiber molecule, a reactive functional group such as hydroxyl group, amino group or the like are particularly preferred. These fibers are preferred because a group having the metalloid element chelate-forming capability described above can be easily introduced by utilizing the reactive functional group in the fiber molecule. Even in case-where a fiber having no reactive functional group such as described above in its molecule is used, a reactive functional group is introduced into the molecule of the fiber by any method such as oxidation and then the group described above is introduced by utilizing this functional group.

The form of the above described fiber is not also specifically limited, and may be monofilament or multifilament of long fibers, spun yarn of short fibers, woven or knitted fabric obtained by weaving or knitting them, and non-woven fabric or paper. It is also possible to use fibers obtained by combining two or more kinds of fibers, or a woven/knitted fabric thereof.

In the present invention, the group to be introduced into the above described fiber must have an amino group and two or more hydroxyl groups, particularly two or more hydroxyl groups bonded to adjacent carbon, in order to form a chelate with metalloid elements, as is apparent from the above scheme [3].

Preferred group, which satisfies such requirements, is as represented by the above formula [1], wherein G represents a chain sugar alcohol residue or a chain polyhydric alcohol residue, and R represents a hydrogen atom, a (lower) alkyl group, or G (G is as defined above and may be a group identical with or different from the above G). Among R, hydrogen or a (lower) alkyl group (particularly methyl or ethyl group) is considerably suitable for practical use.

Among the groups represented by the above formula [1], a group wherein G is a chain sugar alcohol residue or a chain polyhydric alcohol residue and R is a hydrogen atom or a (lower) alkyl group is particularly preferred. Specific examples thereof include chain sugar alcohol residue wherein an amino group is eliminated from D-glucamine, D-galactamine, D-mannosamine, D-arabitilamine, N-methyl-D-glucamine, N-ethyl-D-glucamine, N-methyl-D-galactamine, N-ethyl-D-galactamine, N-methyl-D-mannosamine, N-ethyl-D-arabitilamine or the like, and dihydroxyalkyl group. Among them, a residue wherein an amino group of D-glucamine or N-methyl-D-glucamine is eliminated, or a dihydroxykpropyl group is most preferred in view of ease of introducing it into the fiber molecule and availability of the raw material.

The group to be introduced into the fiber molecule to impart the metalloid element chelate-forming capability may be bonded directly to the reactive functional group (e.g. hydroxyl group, amino group, imino group, carboxyl group, aldehyde group, thiol group, etc.) in the fiber molecule, or may also be bonded indirectly to the reactive functional group through a crosslinkage. In view of the ease of introducing it into the fiber molecule, those introduced indirectly through the crosslinkage as described below are recommended as considerably suitable for practical use.

As the process for producing the metalloid element chelate-forming fiber according to the present invention, for example, there can be employed a process, which comprises reacting the above-described intrinsic reactive functional group of the fiber molecule or a reactive functional group introduced by modification directly with the amine compound represented by the above general formula [2], or reacting the reactive functional group with a compound having, in a molecule, two or more functional groups such as epoxy group, reactive double bond, halogen group, aldehyde group, carboxyl group, isocyanate group, etc. and reacting the reaction product with the amine compound represented by the general formula [2].

When the fiber molecule has a hydroxyl group, a carboxyl group or the like, it is possible that these groups are reacted directly with the amine compound represented by the above general formula [2] and then the reaction product is introduced into the fiber molecule in the form of a pendant. Typical reaction in this case will be shown as follows.

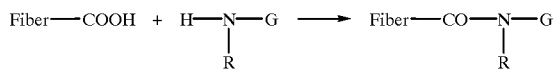

(wherein G and R are as defined above.)

When the reactivity between the reactive functional group in the fiber molecule and the amine compound is insufficient, it is possible that a functional group having high reactivity with the above amine compound is first introduced to the fiber molecule in the form of a pendant by reacting the fiber with a crosslinking agent, and then a group having a metalloid element chelate-forming capability is introduced to the fiber molecule in the form of a pendant by reacting the functional group with the above amine compound. When employing the latter process, a metalloid element scavenging capability (i.e. amount of a group having a metalloid element chelate-forming capability to be introduced) according to the application purposes can be optionally controlled by controlling the amount of the crosslinking agent and an amine compound to be used based on the amount of the fiber, which is particularly preferred.

Preferred crosslinking agent to be used herein includes, for example, compounds having two or more groups, such as epoxy group, reactive double bond, halogen group, aldehyde group, carboxyl group, isocyanate group, etc., preferably having two groups. Specific examples of the preferred crosslinking agent include glycidyl methacrylate, glycidyl acrylate, allyl glycidyl ether, glycidyl sorvate, epichlorohydrin, epibromohydrin, ethylene glycol diglycidyl ether, neopentyl glycol diglycidyl ether, glycerin diglycidyl ether, polypropylene glycol diglycidyl ether, maleic acid, succinic acid, adipic acid, glyoxazol, glyoxylic acid, tolylene diidocyanate, hexamethylene diisocyanate and the like. Among them, glycidyl methacrylate, epichlorohydrin and ethylene glycol diglycidyl ether are particularly preferred.

When the amine compound is introduced by using the above crosslinking agent, specific reaction is as follows.

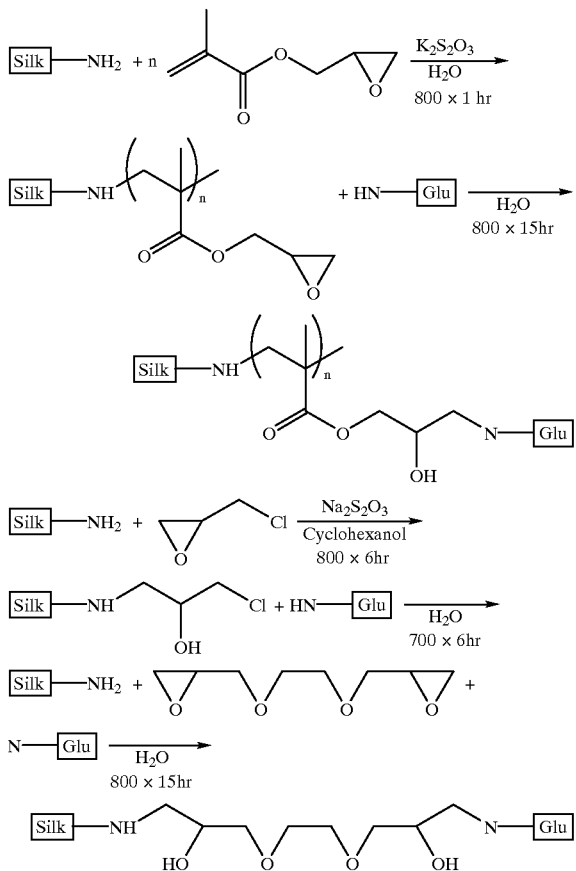

The reaction on introduction of a group having a metalloid element chelate-forming capability into the fiber using these crosslinking agents is not specifically limited, but preferred process is a process for reacting a base fiber with the above crosslinking agent in water or a polar solvent such as N,N'-dimethylformamide, dimetfiyl sulfoxide, etc., optionally using a reaction catalyst and an emulsifier, at about 60–100° C. for about 30 minutes to several tens hours. According to this reaction, the crosslinking agent reacts with a reactive group (e.g. hydroxyl group, amino group, etc.) in the fiber molecule to combine with the fiber, thereby making it possible to introduce a functional group capable of easily-reacting with the amine compound represented by the above formula [2] into the fiber molecule. When the fiber, into which the functional group has been introduced, is then reacted with the above amine compound in water or a polar solvent such as N,N'-dimethylformamide, dimethyl sulfoxide, etc., optionally using a reaction catalyst, at about 60–100° C. for about 30 minutes to several tens hours, an amino group of the above amine compound reacts with a reactive group (e.g. epoxy group, halogen group, etc.) of the crosslinking agent, thereby introducing a group represented by the above formula [1], which has a metalloid element chelate-forming capability, into the fiber molecule in the form of a pendant.

This reaction is usually conducted successively in the manner as described above, but the fiber can be reacted simultaneously with the crosslinking agent and amine compound according to the reaction system. As the base fiber to be used in this reaction, for example, monofilament or multifilament of long fibers, spun yarn of short fibers, woven or knitted fabric produced by weaving or knitting them, and non-woven fabric or paper can be used by optional selection and, furthermore, fibers produced by using two or more kinds of fibers in combination or a woven/knitted fabric thereof can be used as explained previously.

Considering the amount of the reactive functional groups in the base fiber molecule, the amount of the group having the above metalloid element chelate-forming capability to the fiber to be introduced can be optionally controlled by controlling the amount of the amine compound to be used in the introduction reaction, the amount of the crosslinking agent and amine compound, and the reaction conditions. To impart sufficient metalloid element scavenging capability to the fiber, it is preferable to control the amount of the group so that the substitution rate calculated by the following equation becomes 10% by weight or more, more preferably 20% by weight or more.

Substitution rate (weight percent)=[(weight of fiber after introduction of substituent—weight of fiber before introduction of substituent)/(weight of fiber before introduction of substituent)]×100

(wherein the substituent represents a group represented by the above formula [1])

To enhance the metalloid element capturing capability of the fiber, the higher the above substitution rate, the better. Accordingly, the upper limit of the substitution rate is not specifically limited. When the substitution rate becomes too high, the crystallizability of the substituent-introduced fiber is enhanced and the fiber tends to become weak and, therefore, the substitution rate is preferably about 130% by weight or less, more preferably about 80% by weight or less, synthetically considering utility as the metalloid element scavenger and economical efficiency. According to the kind of the functional group, amine compound in the fiber molecule and the crosslinking agent, and the applications of the fiber, the metalloid element capturing capability can also be enhanced by controlling to high substitution rate such as 150–200% by weight.

The metalloid element chelate-forming fiber obtained as described above can be obtained in the form of monofilament, multifilament, spun yarn, non-woven fabric, woven or knitted fabric, or paper, which has any properties, according to the properties of the fiber to be used. Any way, since substantially all of the above-described groups having the metalloid element chelate-forming property introduced into the molecular surface of the fiber having a fine diameter effectively exhibit the metalloid element capturing performance, the metalloid element chelate-forming fiber exhibits a noticeably superior metalloid element scavenging rate than that of those having a conventional granular form.

That is, according to the present invention, the fiber having chelate forming ability has the following advantages over a conventional granular chelate resin.

(1) A conventional granular chelate resin forms a chelate with metalloid elements or compounds thereof on the granular surface and pore portions. However, since diffusion rate of the metalloid elements is slow and substantially all functional groups can not contribute to chelate formation, effective utilization rate of the whole chelate resin is considerably low and the absolute amount of elements, which can be scavenged, becomes insufficient necessarily. In the present invention, since all of the chelate-forming functional groups introduced into the fiber surface are effectively utilized for chelate forming with the metalloid elements, considerably high chelate capturing capability can be obtained by using it in a small amount.

(2) Moreover, in a conventional granular chelate resin, since diffusion in the pore portion proceeds slowly as described in the above item (1), a sufficient capturing effect can not be obtained without contacting the granular chelate resin with the solution to be treated for considerably long time. When the particle diameter is decreased excessively to enlarge substantially effective specific surface area, a loss in pressure becomes large and, therefore, it can not be utilized substantially for removing boron in the gas. However, according to the chelate-forming fiber of the present invention, high contact efficiency can be easily obtained even in the case of the gas because of its large effective surface area. If the fiber-packed layer is increased, if necessary, a trace amount of metalloid elements contained in the gas can be efficiently captured.

(3) For the reason as described in the above item (2), a conventional granular chelate resin can be substantially utilized only for capturing metals in the liquid. However, the chelate-forming fiber of the present invention can be effectively used for not only the liquid, but also metalloid elements contained in the gas, such as air, exhaust gas, etc., by making use of its excellent specific surface area.

(4) Since a chelate-forming functional group of the present invention is exposed to the fiber surface, an adsorption rate is high and a break-through curve shows good steep rising.

(5) On drying, a granular chelate resin generally becomes weak and is converted into fine powder and, therefore, it becomes impossible to put to practical use. Since the chelate fiber of the present invention does not becomes brittle on drying because a chelate-forming functional group is introduced into the fiber material.

(6) In the case of a granular chelate resin, the form on use is limited according to the shape of a packing container. However, a chelate fiber can be used in any form by converting into the form of a non-woven fabric or a woven/knitted fabric.

(7) In the case of a granular chelate resin, the porosity is automatically decided by the particle diameter. However, in the case of a chelate fiber, the packing density (apparent density) can be optionally modified and the porosity can be freely controlled.

(8) In some case, it becomes possible to utilize as a fibrous catalyst in the state where metalloid elements are captured.

(9) When a metalloid element component is captured as described above using the chelate-forming fiber of the present invention and then treated with an aqueous strong acid solution such as hydrochloric acid, sulfuric acid, etc., metalloid elements captured after forming a chelate with the fiber can be easily eliminated, thereby making it possible to easily regenerate and to effectively recover the metalloid element component as a valuable component from the regenerated solution.

In addition to the advantages given by taking the form of the fiber as described above, the chelate-forming fiber of the present invention has such characteristics that a chelate is selectively formed with the metalloid elements even if other metallic ions, e.g. ions of metal such as Mg, Ca, Zn, Na, K, etc. or other anions, e.g. ions of halogen such as fluorine, chlorine, iodine, etc. coexist. Therefore, the chelate-forming fiber can also be utilized as a selective scavenger of the metalloid elements, very effectively.

Accordingly, when this fiber is brought into contact with a liquid or gas containing the metalloid elements or compounds thereof, specifically the fiber is layered in an optional thickness, or packed in a column and penetrated with a liquid or gas to be treated, metalloid element components contained in the liquid or gas to be treated can be selectively captured.

EXAMPLES

The examples of the present invention will be illustrated but the present invention is not limited to the following examples, and modifications can be made without departing from the purports described hereinabove and hereinafter and are also included in the technical scope of the present invention.

Example 1

In a solution prepared by dissolving 2.0 g of glycidyl methacrylate, 0.2 g of sodium dodecylsulfate, 2.0 g of aqueous 1% $H_2O_2$ and 5.3 g of an aqueous 0.5% thiourea dioxide solution in 80 ml of distilled water, 2.0 g of a cotton fabric (unbleached cotton unit) was dipped and subjected to a heat treatment at 60° C. for 1.5 hours. Then, the heat-treated cotton fabric was washed with distilled water, dehydrated and dried at 20° C. for 15 hours to obtain 2.9 g of a graft fiber wherein glycidyl methacrylate is grafted.

In a solution prepared by dissolving 30 g of N-methyl-D-glucamine in 270 g of distilled water, the above grafted fiber was dipped and subjected to a heat treatment at 80° C. for 15 hours. Then, the grafted fiber was sufficiently washed with water and dried at 20° C. for 15 hours to obtain 3.9 g (substitution rate: 34.5% by weight) of a fiber (hereinafter referred to as chelate fiber A) having a metalloid element chelate-forming capability.

1 g of the resulting chelate fiber A was added to 500 ml of an aqueous boric acid solution (5 mmol/l) and, after stirring at 20° C. for 20 hours, the boron capturing capability was examined by determining the amount of boron remained in the solution. As a result, it has been confirmed that the boron capturing capability of 1.3 mmol per 1 g of the chelate fiber A is exhibited.

For comparison, the boron capturing capability was examined in the same procedure as described above, except for using a commercially available beads-like styrene-glucamine chelate resin (manufactured by Mitsubishi Chemical Co. under the trade name of "Dia Ion CRB02") in place of the above chelate fiber A. As a result, the chelate resin showed the boron capturing capability of only 0.8 mmol per 1 g (calculated based on solid content) of the chelate resin is obtained.

After 1 g of the above chelate fiber A was dipped in distilled water at 20° C. for 15 hours, boric acid was added so that the boron concentration becomes 50 ppm (total amount: 500 ml) and a change in boron concentration of the solution with an elapsed time was examined. With respect to the above commercially available beads-like styrene-glucamine chelate resin (aforecited), the change in boron concentration of the solution with an elapsed time was also examined in the same procedure as described above.

The results are shown in FIG. 1. It takes not less than about 30 minutes until the boron scavenging performance is saturated in the case of the commercially available chelate resin, while the time required to saturate the boron capturing performance when using the chelate fiber A of the present invention is only about 5 minutes. As is apparent from these results, the chelate fiber of the present invention has the boron capturing performance that is about six times that of the conventional chelate resin, in terms of a rate.

Example 2

In a solution prepared by dissolving 3.6 g of glycidyl methacrylate, 0.36 g of sodium dodecylsulfate and 0.16 g of potassium persulfate in 350 ml of distilled water, 5.2 g of a habutae-silk having a weight of 6 'momme' (6×0.132 oz.) was dipped and subjected to a heat treatment at 80° C. for 1 hour. Then, the heat-treated habutae-silk was washed with distilled water, dehydrated and dried at 20° C. for 15 hours to obtain 7.8 g of a graft fiber wherein glycidyl methacrylate is grafted.

In a solution prepared by dissolving 80 g of N-methyl-D-glucamine in 720 g of distilled water, the above grafted fiber was dipped and subjected to a heat treatment at 80° C. for 15 hours. Then, the grafted fiber was sufficiently washed with water and dried at 20° C. for 15 hours to obtain 10.1 g (substitution rate: 29.5% by weight) of a fiber (hereinafter referred to as chelate fiber B) having a metalloid element chelate-forming capability.

1 g of the obtained chelate fiber B was added to 500 ml of an aqueous boric acid solution (5 mmol/l) and, after stirring at 20° C. for 20 hours, the boron capturing capability was examined by determining the amount of boron remained in the solution. As a result, it has been confirmed that the boron capturing capability of 1.2 mmol per 1 g of the chelate fiber B is exhibited.

Figure 2:
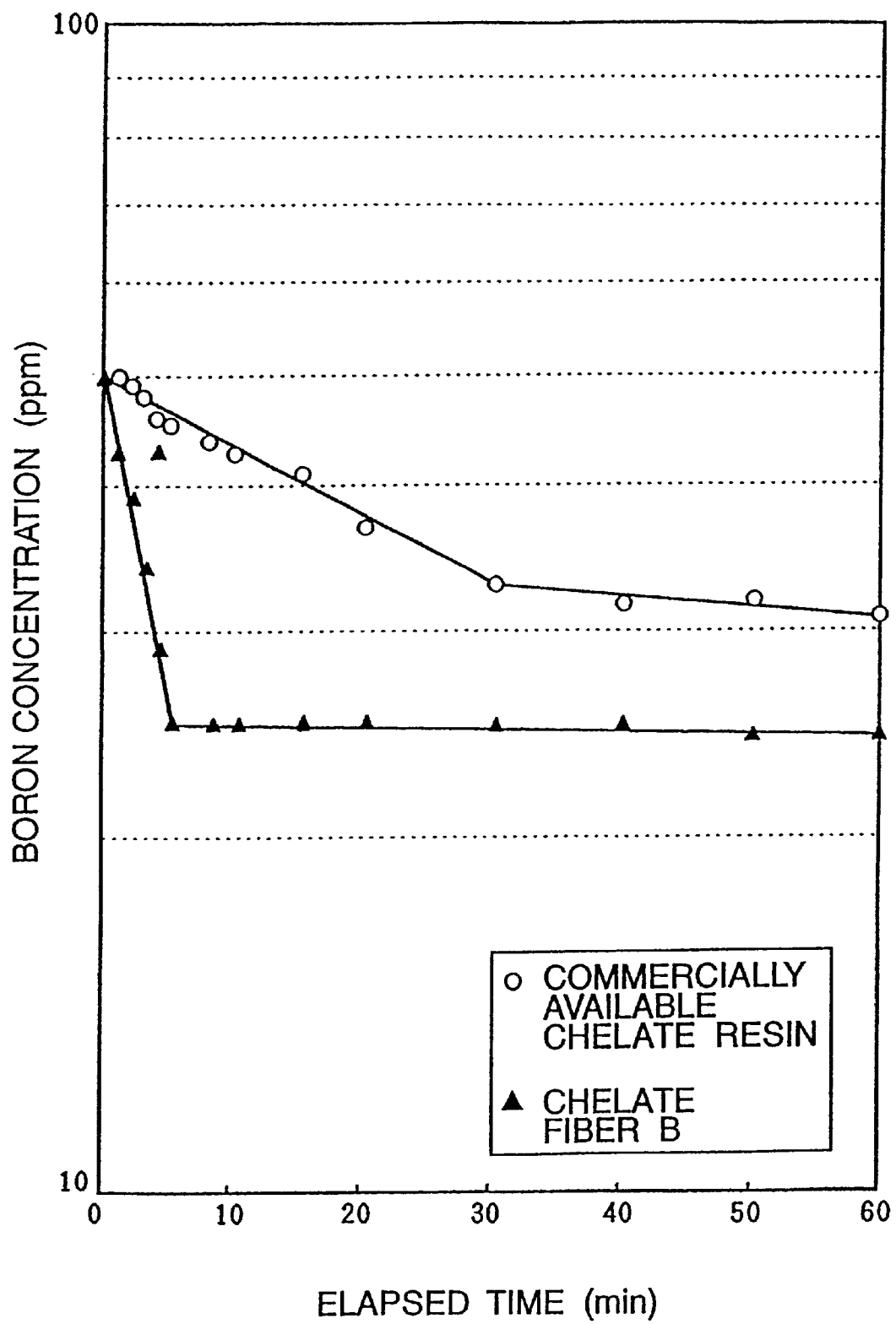
FIG. 2 is a graph showing a relation between the boron concentration and the scavenging rate of the chelate fiber B obtained in the example as compared with a commercially available beads-like chelate resin.

Using the above chelate fiber B, a evaluation test of the boron capturing rate was conducted in the same procedure as in Example 1. The results are shown in FIG. 2. The boron capturing rate of the beads-like chelate resin used as a comparative material in Example 1 was also described in FIG. 2, for comparison.

As is apparent from FIG. 2, the boron capturing capability was also saturated within only about 5 minutes in the case of the chelate fiber B of the present invention and, therefore, it exhibits a noticeably superior boron capturing rate than that of the commercially available beads-like chelate resin.

Example 3

In a solution prepared by dissolving 26.8 g of N-methyl-D-glucamine and 23.9 g of ethylene glycol diglycidyl ether in 400 ml of N,N-dimethylformanide, 2 g of a habutae-silk having a weight of 6 'momme' (6×0.132 oz.) was dipped and subjected to a heat treatment at 80° C. for 15 hours. Then, the heat-treated habutae-silk was washed with distilled water, dehydrated and dried at 20° C. for 15 hours to obtain 2.5 g (substitution rate: 25.0% by weight) of a fiber (hereinafter referred to as chelate fiber C) having a metalloid element chelate-forming capability, wherein N-methyl-D-glucamine is introduced in the form of a pendant.

1 g of the obtained chelate fiber C was added to 500 ml of an aqueous boric acid solution (5 mmol/l) and, after stirring at 20° C. for 20 hours and further filtration, the boron capturing capability was examined by determining the amount of boron remained in the filtrate. As a result, it has been confirmed that the chelate fiber C exhibits the boron scavenging capability of 1.2 mmol per 1 g of the fiber.

Using the chelate fiber C, a evaluation test of the boron capturing rate was conducted in the same procedure as described above. The results shown in FIG. 3 were obtained. The results obtained when using a commercially available beads-like chelate resin as a comparative example was also described in this drawing.

Figure 3:
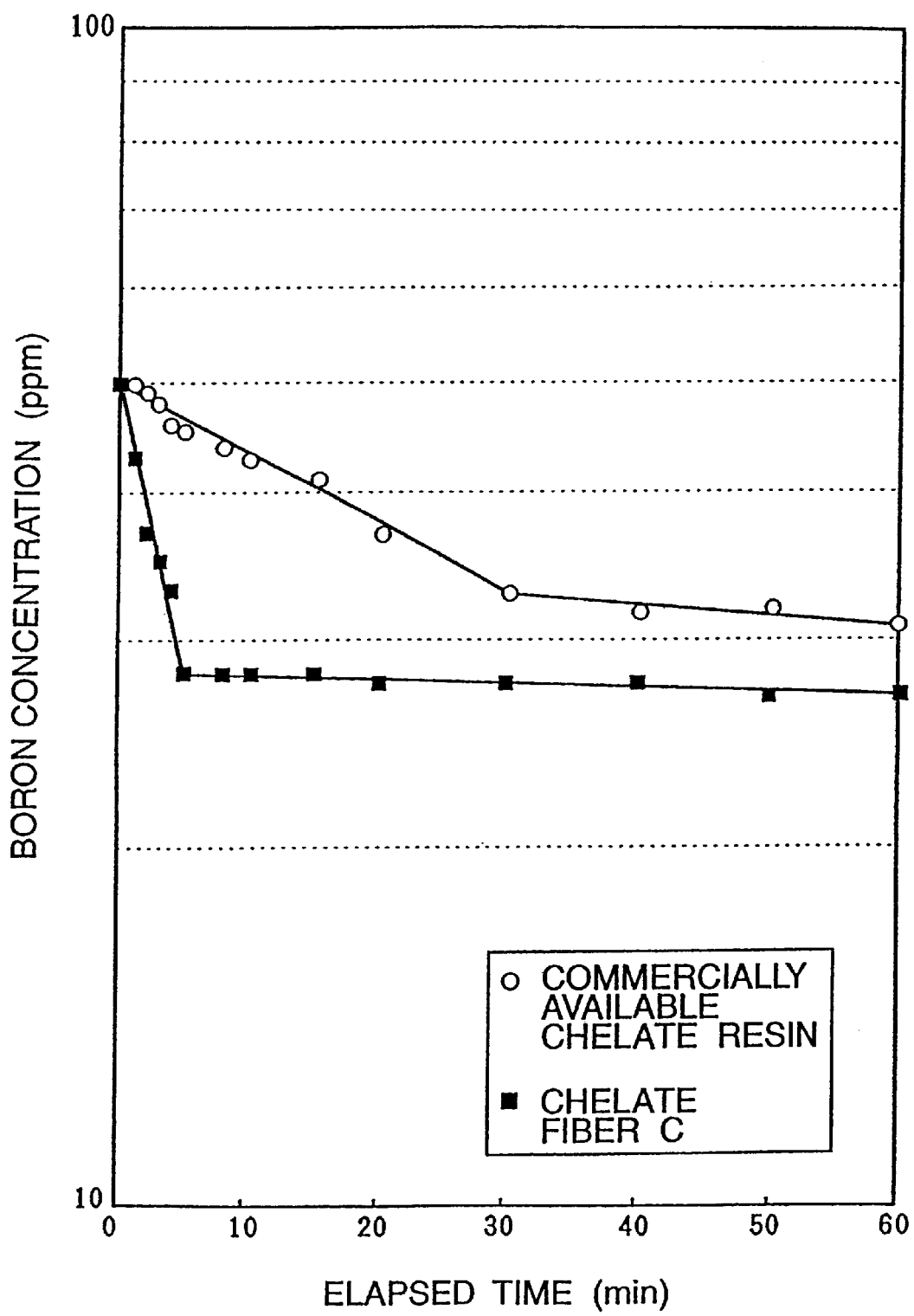
FIG. 3 is a graph showing a relation between the boron concentration and the scavenging rate of the chelate fiber C obtained in the example as compared with a commercially available beads-like chelate resin.

As is apparent from FIG. 3, the boron scavenging capability was also saturated within only about 5 minutes in the case of the chelate fiber C of the present invention and, therefore, it exhibits a noticeably superior boron capturing rate than that of the commercially available beads-like chelate resin.

Example 4

Four chelate fiber cotton fabrics (made of 100% cotton) obtained in the same procedure as in Example 1 were layered and the air containing a trace amount of boron components (content reduced based on boron: 21 ng/m$^3$) was passed through the layered chelate fiber cotton fabrics under the following conditions.

Area through which air is passed: 78.5 cm$^2$

Amount of air: 150 liters/min

The residual amount of boron of the air passed through the layered chelate fiber cotton fabrics was measured. As a result, it has been confirmed that the amount of boron is decreased to 1 ng/m$^3$ or less.

Example 5

1 g of the same chelate fiber A as that used in Example 1 was added to 500 ml of an aqueous germanium oxide solution (5 mmol/l) and, after stirring at 20° C. for 20 hours, the germanium capturing capability was examined by determining the amount of germanium remained in the solution. As a result, it has been confirmed that 1.0 mmol of germanium can be captured by using 1 g of the chelate fiber A.

On the other hand, the germanium scavenging capability was examined by using a commercially available beads-like styrene-glucamine chelate resin (manufactured by Mitsubishi Chemical Co. under the trade name of "Dia Ion CRB02") in the same procedure as described above. As a result, it has been confirmed that the germanium captured capability per 1 g of "Dia Ion CRB02" is merely 0.7 mmol (70% of the chelate fiber A).

Example 6

1 g of the same chelate fiber A as that used in Example 1 was added to 500 ml of an aqueous arsenic sesquioxide solution (5 mmol/l) and, after stirring at 20° C. for 20 hours, the arsenic capturing capability was examined by determining the amount of germanium remained in the solution. As a result, it has been confirmed that 0.4 mmol of arsenic can be scavenged by using 1 g of the chelate fiber A.

On the other hand, the arsenic scavenging capability was examined by using a commercially available beads-like styrene-glucamine chelate resin (manufactured by Mitsubishi Chemical Co. under the trade name of "Dia Ion CRB02") in the same procedure as described above. As a result, it has, been confirmed that the arsenic scavenging capability per 1 g of "Dia Ion CRB02" is merely 0.2 mmol (50% of the chelate fiber A).

Example 7

The same chelate fiber A and "Dia Ion CRB02" (each 4 g) as those used in Example 1 were separately charged in a glass column having a diameter of 10 mm and an aqueous boric acid solution (10 mmol/l) was passed through each column at a flow rate SV of 10 hr$^1$. Then, each break-through curve was determined by measuring the boron concentration of the effluent.

Figure 4:
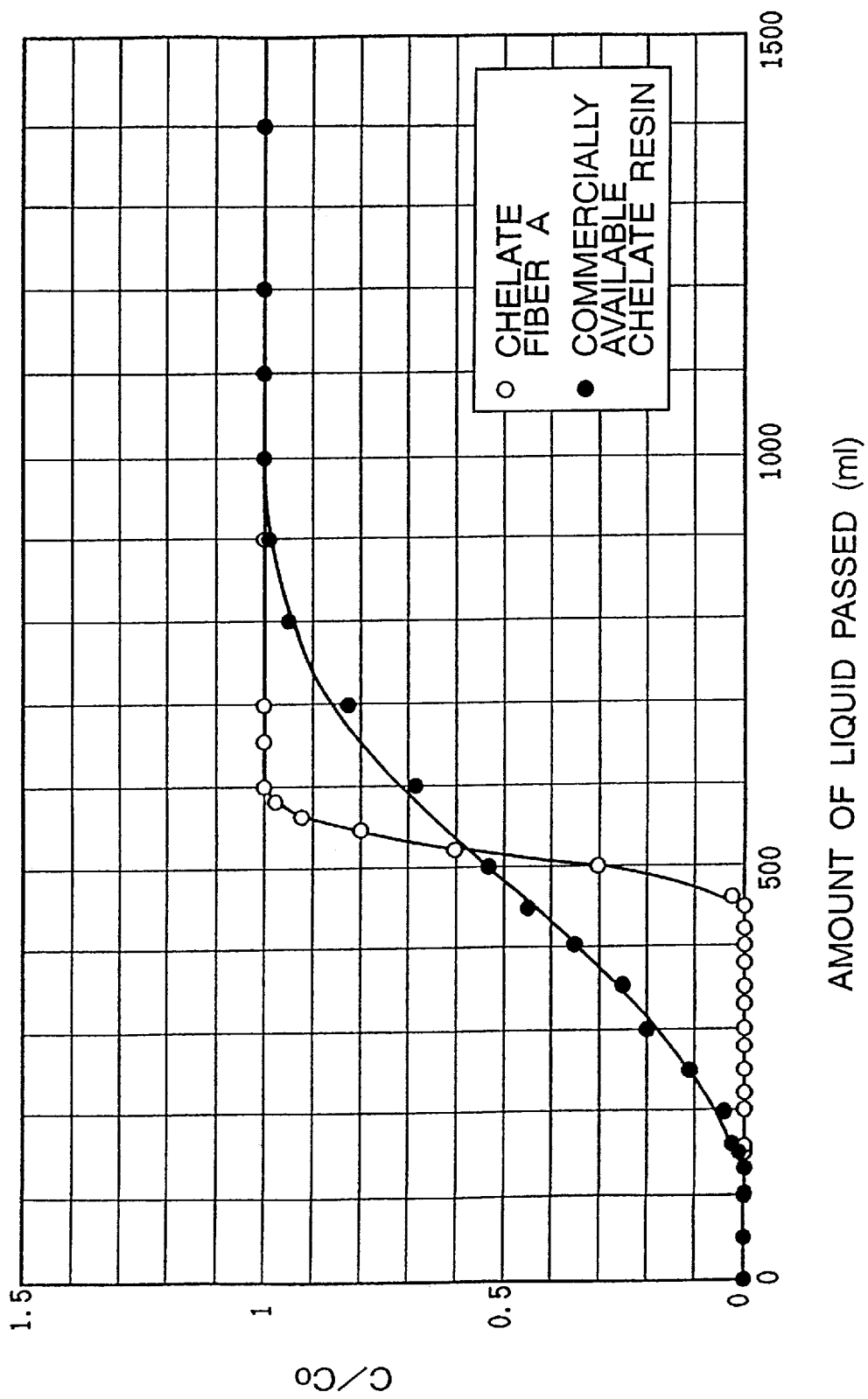
FIG. 4 is a graph showing a break-through curve of the chelate fiber according to the present invention as compared with a commercially available chelate resin, when using boron as a subject for scavenging a chelate.

The results are as shown in FIG. 4. In the case of the chelate fiber A of the present invention, the break-through curve shows a steep rising and nearly complete boron capturing is carried out until the chelate forming capability is saturated. On the other hand, in the case of the commercially available chelate resin "Dia Ion CRB02", the break-through curve shows an easy rising from the beginning of the treatment through break-through because of its poor capturing performance, thus making it possible to confirm that a large amount of boron effuses up to a break-through point without being captured.

The present invention is constructed as described above. Not only the capacity of capturing metalloid elements is high, but also the capturing rate is noticeably superior and, therefore, the metalloid elements in irrigation/waste water and the air (including various exhaust gases) can be captured and removed, very efficiently, as compared with the ion exchange resin and chelate resin of the prior art, thus making it possible to purify them, very effectively. Moreover, since the chelate fiber containing captured metalloid elements of the present invention is capable of simply eliminating the metalloid components by a treatment with an aqueous acid solution, not only the chelate fiber can be easily regenerated and used repeatedly, but also it can be utilized for concentration/collection of the metalloid components. When using a chelate fiber (including paper) in the form of a non-woven fabric or a fabric, the chelate fiber can be easily incinerated by a conventional incinerator in case where the performance of capturing the metalloid elements is lost as a result of repeated use.

Furthermore, when employing the process of the present invention, a metalloid element-capturing fiber with high performance can be obtained in a simple and safe manner, such as heating treatment in water or a conventional polar solvent, without using a special apparatus or treatment using ionizing radiations.

What is claimed is:

1. A chelate-forming fiber which has, in a fiber molecule, a group represented by the following general formula [1]:

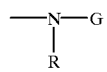

[1]

wherein G represents a chain sugar alcohol residue or a chain polyhydric alcohol residue, and R represents a hydrogen atom, a lower alkyl group, or G and may be a group identical with or different from the above G and has a capability of forming a chelate with metalloid elements or compounds thereof.

2. The chelate-forming fiber according to claim 1, wherein G in the above formula [1] is a residue in which an amino group is eliminated from D-glucamine and R is a hydrogen atom or a lower alkyl group.

3. The chelate-forming fiber according to claim 1, wherein G in the above formula [1] is a dihydroxypropyl group and R is hydrogen or a lower alkyl group.

4. The chelate-forming fiber according to claim 1, wherein the group of formula [1] is directly bonded to a reactive functional group in the fiber molecule.

5. The chelate-forming fiber according to claim 1, wherein the group of formula [1] is introduced into a reactive functional group in the fiber molecule through a crosslinkage.

6. The chelate-forming fiber according to claim 1, wherein the fiber is a natural fiber or a regenerated fiber.

7. The chelate-forming fiber according to claim 1, wherein the fiber is a synthetic fiber.

8. The chelate-forming fiber according to claim 1, wherein metalloid elements or compounds thereof are boron or a boron compound.

9. A process for preparing a fiber having a capability of forming a chelate with metalloid elements or compounds thereof, which comprises reacting a reactive functional group in a fiber molecule directly with an amine compound represented by the following general formula [2]:

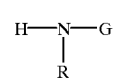

[2]

wherein G represents a chain sugar alcohol residue or a chain polyhydric alcohol residue, and R represents a hydrogen atom, a lower alkyl group, or G and may be a group identical with or different from the above G.

10. The process according to claim 9, wherein the amine compound is D-glucamine or N-methyl- D-glucamine.

11. The process according to claim 9, wherein the amine compound is dihydroxypropylamine.

12. A process for preparing a chelate-forming fiber, which comprises reacting a reactive functional group in a fiber molecule with a compound having, in a molecule, two or more of an epoxy group, a halogen group and a reactive double bond, and reacting the reaction product with the amine compound to impart a capability of forming a chelate with metalloid elements or compounds thereof, the amine compound being represented by the following general formula [2]:

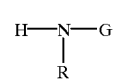

[2]

wherein G represents a chain sugar alcohol residue or a chain polyhydric alcohol residue, and R represents a hydrogen atom, a lowers alkyl group, or G and may be a group identical with or different from the above G.

13. The process according to claim 12, wherein the amine compound is D-glucamine or N-methyl- D-glucamine.

14. The process according to claim 12, wherein the amine compound is dihydroxypropylamine.

15. A method for capturing metalloid elements or compounds thereof, which comprises capturing metalloid elements or compounds thereof by a chelate-forming fiber which has, in a fiber molecule, a group represented by the following general formula [3]:

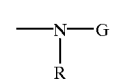

[3]

wherein G represents a chain sugar alcohol residue or a chain polyhydric alcohol residue, and R represents a hydrogen atom, a lower alkyl group, or G and may be a group identical with or different from the above G and has a capability of forming a chelate with metalloid elements or compounds thereof.

16. The method according to claim 15, wherein the chelate-forming fiber is brought into contact with a liquid containing metalloid elements or compounds thereof to scavenge the metalloid elements or compounds thereof in the liquid.

17. The method according to claim 15, wherein the chelate-forming fiber is brought into contact with a gas containing metalloid elements or compounds thereof to capture the metalloid elements or compounds thereof in the gas.

18. The method according to claim 15, wherein the metalloid elements or compounds thereof is boron or the boron compound.

* * * * *